US 11,917,988 B2

(12) United States Patent
Griffith et al.

(10) Patent No.: US 11,917,988 B2
(45) Date of Patent: Mar. 5, 2024

(54) HOOF BLOCK AND RELATED METHOD OF USE

(71) Applicant: Bohning Company, Ltd., Lake City, MI (US)

(72) Inventors: Larry R. Griffith, Lake City, MI (US); Robert L. Potter, McBain, MI (US)

(73) Assignee: Bohning Company, LTD., Lake City, MI (US)

( * ) Notice: Subject to any disclaimer, the term of this patent is extended or adjusted under 35 U.S.C. 154(b) by 144 days.

(21) Appl. No.: 17/591,104

(22) Filed: Feb. 2, 2022

(65) Prior Publication Data

US 2023/0240278 A1    Aug. 3, 2023

(51) Int. Cl.
*A01L 9/00*    (2006.01)

(52) U.S. Cl.
CPC ..................... *A01L 9/00* (2013.01)

(58) Field of Classification Search
CPC ..... A01L 9/00; A01L 5/00; A01L 3/00; A01L 3/02; A01L 7/02; A01K 13/007
USPC .......................................................... 168/12
See application file for complete search history.

(56) References Cited

U.S. PATENT DOCUMENTS

| | | | | |
|---|---|---|---|---|
| 5,272,857 | A * | 12/1993 | Logan | A61D 9/00 54/82 |
| 5,875,853 | A * | 3/1999 | Logan | A01L 9/00 54/82 |
| 6,056,062 | A * | 5/2000 | Robison | A01L 9/00 168/24 |
| 6,152,235 | A * | 11/2000 | Woodruff | A01L 3/06 168/5 |

(Continued)

FOREIGN PATENT DOCUMENTS

| | | | | |
|---|---|---|---|---|
| ES | 2724913 B2 | * | 1/2020 | ............. A01K 13/00 |
| WO | WO-0203796 A1 | * | 1/2002 | ............... A01L 3/06 |

(Continued)

OTHER PUBLICATIONS

Martin & Carol VanBeek. "The Smart Block—The Next Generation of Hoof Blocks." YouTube, May 18, 2021, https://www.youtube.com/watch?v=7rWVEguoYqc (Year: 2021).*

(Continued)

*Primary Examiner* — Peter M Poon
*Assistant Examiner* — Angelica Alejandra Almeida Bonnin
(74) *Attorney, Agent, or Firm* — Warner Norcross + Judd LLP

(57) ABSTRACT

A hoof block is provided that joins with a livestock hoof via an adhesive. The block can include a body bounded by an interior edge and a curvilinear exterior edge approximating an outer edge of the hoof and multiple shearing polygonal apertures extending through the body. Each of the shearing apertures can have a pointed end and can lay along a reference line that can be disposed at an angle, for example, 30-60 degrees inclusive relative to the interior edge. The apertures can be joined with bridges that shear through the body when the hoof block becomes removed from the hoof and encounters a pump impeller in a livestock facility. The block can break into pieces that do not substantially impair continued operation of the pump impeller, and yet can support the standing and walking loads of the livestock while on the hoof. A related method of use is provided.

18 Claims, 6 Drawing Sheets

(56) References Cited

U.S. PATENT DOCUMENTS

| | | | | |
|---|---|---|---|---|
| 6,516,594 | B2* | 2/2003 | Clark | A01K 13/007 54/82 |
| 2007/0125555 | A1* | 6/2007 | Puhl | A01L 5/00 168/28 |
| 2010/0114155 | A1* | 5/2010 | Siani | A01L 3/06 606/212 |
| 2015/0096503 | A1* | 4/2015 | Dugan | C08G 18/758 168/17 |
| 2016/0029610 | A1* | 2/2016 | Korn | A01L 7/02 168/26 |
| 2016/0100566 | A1* | 4/2016 | VanBeek | A01L 3/00 168/4 |

FOREIGN PATENT DOCUMENTS

| | | | | |
|---|---|---|---|---|
| WO | WO-2015140532 | A1* | 9/2015 | A01K 13/007 |
| WO | WO-2015167857 | A1* | 11/2015 | A01L 15/00 |
| WO | WO-2017165892 | A1* | 9/2017 | A01K 13/007 |
| WO | WO-2018218307 | A1* | 12/2018 | A01K 13/007 |
| WO | 2019030130 | | 2/2019 | |
| WO | WO-2019030130 | A1* | 2/2019 | A01L 15/00 |

OTHER PUBLICATIONS

Martin & Carol VanBeek. "The Smart Block Instructional Video" YouTube, Sep. 3, 2015, https://www.youtube.com/watch?v=CV1ZNGvdJ4k (Year: 2015).*
https://www.leedstone.com/smart-block-2.html?gclid=EAlaIQobChMIse3bhlXD9AIV5HtvBB3mLwwDEAQYAiABEgKGq_D_BwE, downloaded Dec. 1, 2021.
https://www.leedstone.com/bohning-block-bohning-hoof-block.html?gclid=EAlaIQobChMlr8eYiqnD9AIVLWxvBB1zxQgKEAQYAyABEgKUV_D_BWE, downloaded Dec. 1, 2021.
https://www.thesmartblock.com/, downloaded Dec. 28, 2021.
https://shop.bohning.com/bohning-block/, downloaded Dec. 28, 2021.

* cited by examiner

HOOF BLOCK AND RELATED METHOD OF USE

BACKGROUND OF THE INVENTION

The present invention relates to the agricultural industry, and more particularly to hoof blocks for livestock.

On an agricultural farm, despite the best care afforded by farmers, it is not uncommon for a bovine cow to have an injured hoof and to become lame from it. This can cause pain, stress and discomfort to the cow. To alleviate the discomfort, the farmer typically trims the injured portion of the hoof and treats that portion to remove any internal pressure. Frequently, a block or shoe is applied to the healthy side of the hoof so that the injured portion of the hoof is elevated off the ground. With such elevation, the injured portion of the cow's hoof does not bear weight as the injury heals.

Generally, a hoof block can lift an injured portion of the hoof off the ground about an inch. The hoof block assists in this elevation long enough for the injured portion of the hoof to heal so that it can again bear weight. This can be from one week to several months depending on the extent of the injury. For a long time, hoof blocks have been constructed from wood and applied with glue to the bottom of the healthy hoof portion. While this has worked, the wood wears quickly. This can cause premature loss of the block from the hoof, and discomfort to the cow, particularly to the injured portion of the hoof. Further, many dairy farms have become larger, and the cows have to travel longer distances on hard concrete paths to and from a milking station, which have rendered wood hoof blocks even less satisfactory.

To address the shortcomings of wood hoof blocks, some manufacturers have started to make the hoof blocks from a more durable plastic material or rubber. These materials also provide better shock absorption for the cow. An issue with them, however, is that they also are applied with a glue to the cow's hoof. The glue sometimes can bond less well to the smoother surfaces of the plastic or rubber hoof block. Another issue concerns the rigidity of the hoof blocks constructed from such harder plastic or rubber materials. After the hoof block is shed from the hoof, it frequently will enter the farm or facility manure pump system. The pump system typically has a large pump with an impeller that spins at high RPMS to convey liquid manure to a pit or other location. The hard hoof blocks have a tendency to enter the pump and/or jam the pump or impeller, which in turn can damage or shut down the manure pump system. Sometimes, the impeller can become badly jammed and require costly maintenance or repair to get it back up and running after being jammed by a more modern hoof block.

Accordingly, there remains room for improvement in the field of hoof blocks, particularly those that will not impair the operation of manure pump systems on a farm where they are used, but that will still adequately support a hoof.

SUMMARY OF THE INVENTION

A hoof block is provided that joins with a livestock hoof, optionally via an adhesive. The hoof block can include a body bounded by an interior edge and an exterior edge approximating an outer edge of the hoof, and multiple shearing apertures extending through the body.

In one embodiment, each of the shearing apertures can have a pointed or polygonal end and can lay along a reference line that can be disposed at an angle, for example, 30-60 degrees inclusive relative to the interior edge.

In another embodiment, the shearing apertures can be joined with bridges that shear through the body when the hoof block becomes removed from the hoof and encounters a pump impeller in a livestock, farm or other facility. The block can break into pieces that do not substantially impair continued operation of the pump impeller, and yet can support the standing and walking loads of the livestock while on the hoof.

In still another embodiment, the multiple shearing apertures can be in the form of polygonal shearing apertures when viewed from a lower surface of the body. The polygonal apertures can include a first pointed end formed by the intersection of a first wall and a second wall at a first angle between 60 degrees and 120 degrees, inclusive, and can include a second pointed end formed by the intersection of a third wall and a fourth wall at a second angle between 60 degrees and 120 degrees, inclusive. Optionally, in some cases, these first and second angles can be approximate right angles.

In yet another embodiment, the first pointed end of one aperture can extend toward a third pointed end of an adjacent aperture laying along a first reference line. The first and third ends can be separated by a bridge. The bridge's integrity can be compromised via the pointed ends of the apertures extending toward one another, to produce a natural or predetermined line of crack propagation through the bridge, from the one aperture to the next, when the hoof block engages a pump impeller in a manure processing system in the facility where the hoof bock is used, after the hoof block departs the cow's hoof.

In even another embodiment, the hoof block can define multiple sized, shaped and oriented shearing apertures. For example, the hoof block can include a second set of shearing apertures extending through the body, each of the second shearing apertures laying along a second reference line that is at a fourth angle between 30 degrees and 60 degrees inclusive relative to the interior edge, but that is offset and distal relative to the first reference line. In some cases, the first and second reference lines can be parallel to one another.

In a further embodiment, the hoof block can include a third set of shearing apertures extending through the body, each of the third shearing apertures laying along a third reference line that is transverse to the first reference line and the second reference line. The hoof block can be shearable into multiple pieces across the third plurality of shearing apertures along the third reference line, optionally through bridges between adjacent ones of the shearing apertures as well.

In still a further embodiment, one or more of the individual shearing apertures in the above noted sets can be constructed to include converging sidewalls, which converge toward one another as an aperture extends from the lower surface to the upper surface or vice versa. For example, some of the shearing apertures can extend upward from the lower surface of the hoof block and can terminate at a first upper apex bounded by a first sidewall and a second sidewall disposed at an apex angle that optionally is acute. In some cases, the apex angle can be between 2 degrees and 20 degrees, inclusive or other angles. This acute angle can be such that the first sidewall and second sidewall move away from one another when the hoof block encounters an impeller pump, and so that the hoof block material above the apex angle breaks, rips, tears, deforms or shears so that the first and second sidewalls can separate from one another to propagate break-up and tearing of the hoof block.

In a further embodiment, a method of making the hoof block is provided. The method can include: forming a body bounded by a perimeter having an interior edge that transitions to at least one exterior edge that approximates an outer hoof edge of a livestock hoof; defining first shearing apertures in the body, each of the first shearing apertures having a first pointed end and an opposing second pointed end, the first shearing apertures laying along a first reference line that is at a third angle between 30 degrees and 60 degrees inclusive relative to the interior edge; and producing one or more bridges adjacent at least one of the first pointed end and the second pointed end. The bridges can be configured to shear, through a partial or entire thickness of the body, when the hoof block encounters a pump impeller, and so that the hoof block breaks into multiple pieces that do not substantially impair continued operation of the pump impeller.

In still a further embodiment, the method can include molding, 3D printing, machining or otherwise forming the hoof block and the shearing apertures therein to promote crack propagation so that the hoof block can break into smaller pieces than the full hoof block when encountering pump equipment, for example an impeller, after the hoof block departs the hoof to which it was previously secured in a facility.

The current embodiments provide a hoof block that can withstand the compressive standing and walking loads, as well as lateral loads, exerted by livestock wearing the hoof block, yet which quickly and efficiently breaks up into pieces after the hoof block falls off the hoof and encounters a pump within a manure management system of the facility where the livestock is located. Where the hoof block includes adjacent shearing apertures with pointed ends separated by corresponding bridges, the pointed ends facilitate crack and fissure propagation across the bridges. Where the hoof block includes shearing apertures along a multitude of reference lines, some optionally parallel and some optionally transverse to one another, the shearing apertures and associated bridges between the apertures facilitate tearing and destruction of the hoof block across multiple planes and in different areas so that the hoof block can break into multiple small pieces when encountering a pump impeller or other moving portion of manure management equipment. Where the shearing apertures include sidewalls that transition upward to an apex angle and/or an apex bridge in that location, where the apex angle is optionally acute, that apex bridge can be configured to quickly and catastrophically break, rip, tear, deform or shear so that the hoof block in that area breaks into pieces when encountering a pump impeller. On the other hand, the apex angle can be sufficient to withstand the compressive and lateral loads of the livestock while on the livestock, standing or walking, without coming apart.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
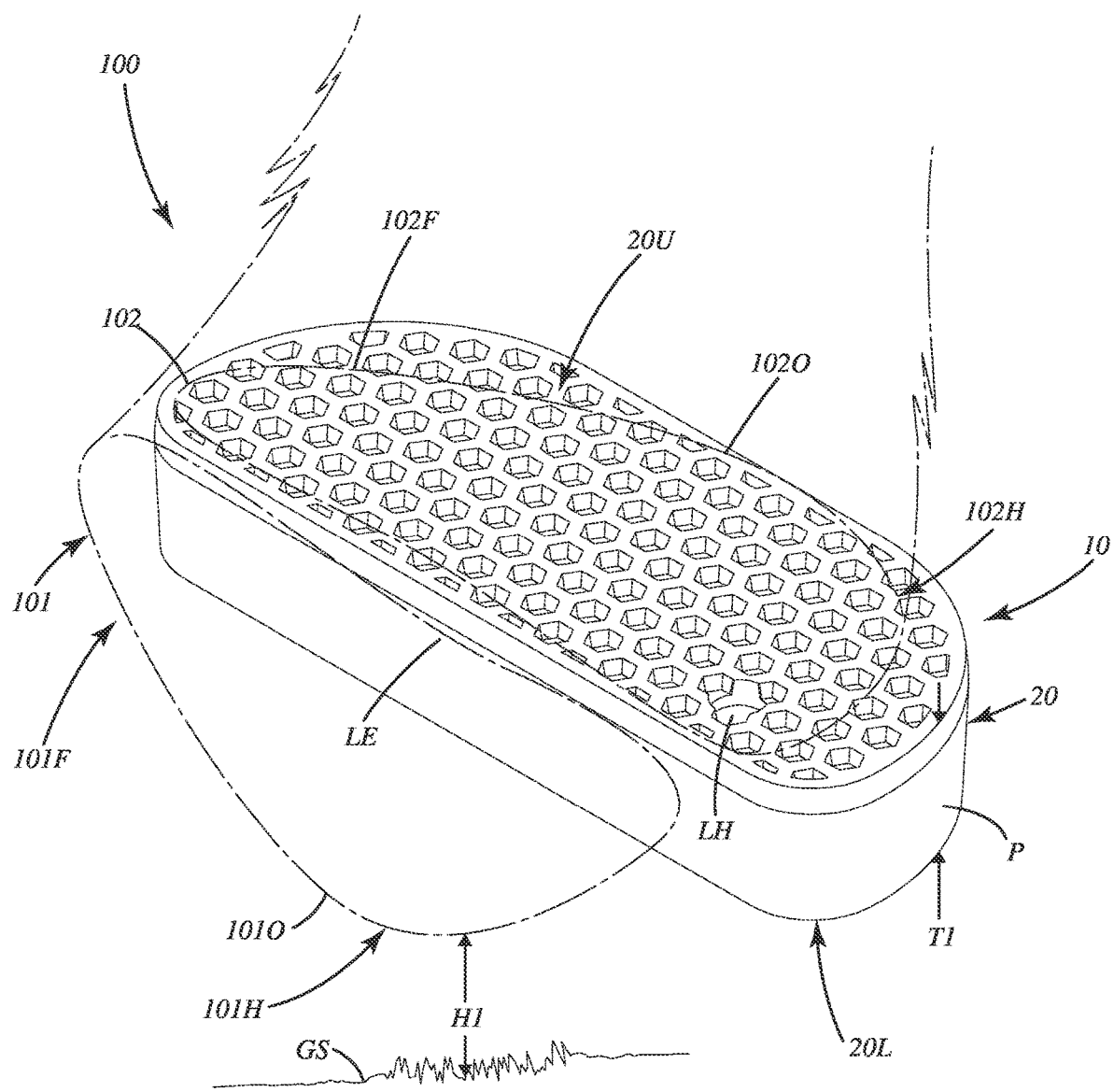
FIG. 1 is an upper perspective view of the hoof block of a current embodiment applied to a hoof of livestock.

A current embodiment of the hoof block is shown in FIGS. 1-8 and generally designated 10. The hoof block is shown in FIG. 1 installed in a bovine cow's hoof 100, but of course can be installed on any other hoofed livestock depending on the application. As shown there, the cow's hoof 100 has a left claw 101 and a right claw 102, and each claw can have a front or toe of the claw, an outer front zone 101F and 102F, as well as outer zones 101O and 102O, as well as heel zones 101H and 102H. For general discussion here, the right claw 102 can be considered the healthy claw, and the left claw 101 can be considered the injured, diseased or unhealthy claw. In this application, the hoof block 10 can be a right claw supporting hoof block, and can be placed under the healthy claw 102, which in turn supports the unhealthy claw above a ground surface GS by a height H1. In cases where the right claw is unhealthy, a left claw supporting hoof block can be used to support the left claw, and can be a mirror image of the hoof block 10 shown in FIG. 1. Optionally, hoof blocks can be sold in kits or left and right hoof blocks to fit left or right claws, depending on what claw is injured.

The height H1 can correspond to a thickness T1 of the body 20 of the hoof block 10. This thickness T1 can be optionally at least ½ inch, ½ inch to 1½ inches, inclusive, ¾ inch to 1¼ inches inclusive, or about 1 inch, depending on the application and particular livestock to which the block is attached. The body can also include a length L1, which can be optionally 4 inches to 7 inches, inclusive, 5 inches to 6 inches inclusive, or about 6 inches. The body can include a width W1, which can be optionally 2 inches to 4 inches, inclusive, 2 inches to 3 inches inclusive, or about 2.5 inches.

The thickness T1 of the body can extend between an upper surface 20U and a lower surface 20L. The body and the surfaces can be bounded by a perimeter P having an interior edge LE that transitions to a forward exterior edge FE and a rearward exterior edge RE toward the outside of the hoof block. The interior edge LE can be generally linear or a straight line. The forward edge FE and rearward edge RE can be round, angled and/or curvilinear. These edges FE and RE can be joined via an exterior or outer edge EE, and all three can approximate an outer hoof edge of a livestock hoof. The outer edge EE optionally can be curvilinear, or can be linear and parallel to the interior edge LE. In some cases, the forward edge FE and rear edge RE can include a radius R, which can optionally be equal. This radius R can be optionally 1 inches to 3 inches, inclusive, 1.5 inches to 2 inches inclusive, or about 1.75 inches. In other cases, the radius can differ from front to back of the block.

Figure 2:
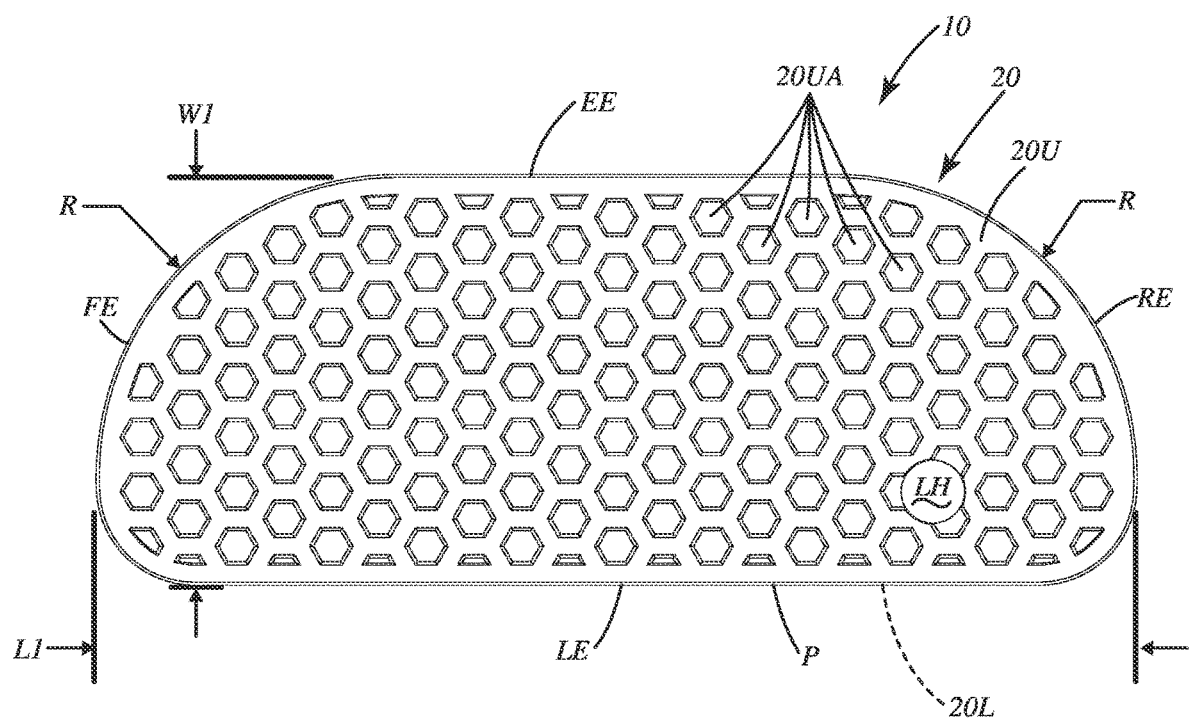
FIG. 2 is an upper view of the hoof block.

FIGS. 1 and 2 show the upper surface 20U of the block 10. The upper surface 20U can include multiple adhesive apertures 20UA. These adhesive apertures 20UA can be shallow recesses that are not contiguous with any of the shearing apertures as described below. These adhesive apertures can be constructed to receive adhesive therein and bond the hoof block 10 to the hoof or claw of the cow. The apertures can provide enhanced or increased surface area with which the adhesive can bond, and can be filled partially or completely with the adhesive to promote the bonding of block to hoof. The adhesive apertures can extend downward from the upper surface a depth of less than 0.25 inches, or less than 0.2 inches, or other depths depending on the application. Optionally, the adhesive apertures do not extend to the lower surface, and in many cases do not connect to and are not in liquid or fluid communication with any of the shearing apertures as described below. Thus, the adhesive applied to the adhesive apertures does not leak from the hoof block via those shearing apertures. Further optionally, the block and body can define a lanyard hole LH that extends through the thickness T1 of the same so that a cord or other lanyard can be joined with the hoof block or multiple hoof blocks to store the same.

As mentioned above, the hoof block 10 can include one or more sets of shearing apertures extending through the body. These shearing apertures can come in a variety of shapes, sizes and dimensions, and can be aligned with one another in sets, along one or more reference lines, or even randomly placed along the body and hoof block in general. The shearing apertures can be joined by bridges adjacent the apertures, and can be configured to include pointed ends to promote, enhance or effectuate shearing of the bridges through the body when the hoof block encounters a pump impeller or other moving component of equipment of a facility where the hoof block is applied to cows. With such shearing apertures, the hoof block can break into multiple, smaller pieces, which each are smaller in volume and surface area than the entire hoof block 10 itself, so the block and pieces do not substantially impair continued operation of the pump impeller, pump, or other equipment, all generally referred to as a pump or impeller.

Figure 3:
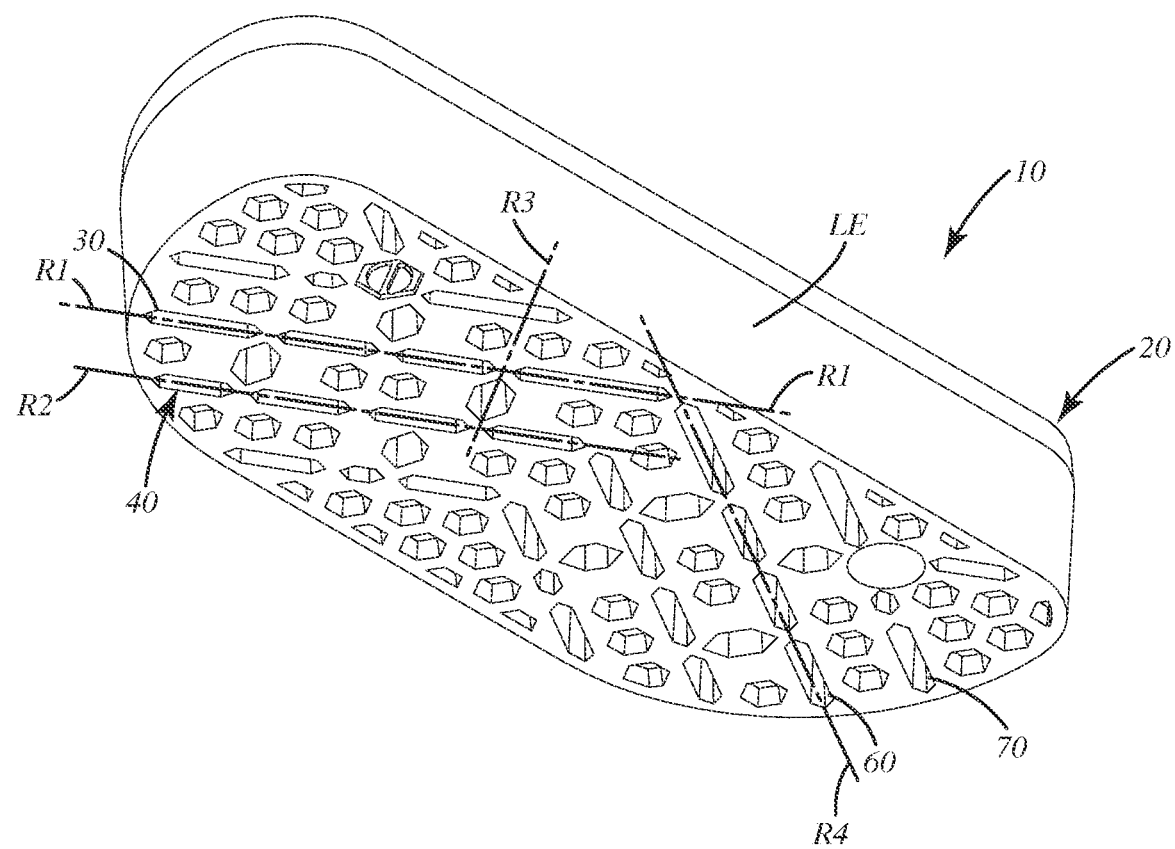
FIG. 3 is a lower perspective view of the hoof block showing multiple shearing apertures along multiple reference lines.
Figure 4:
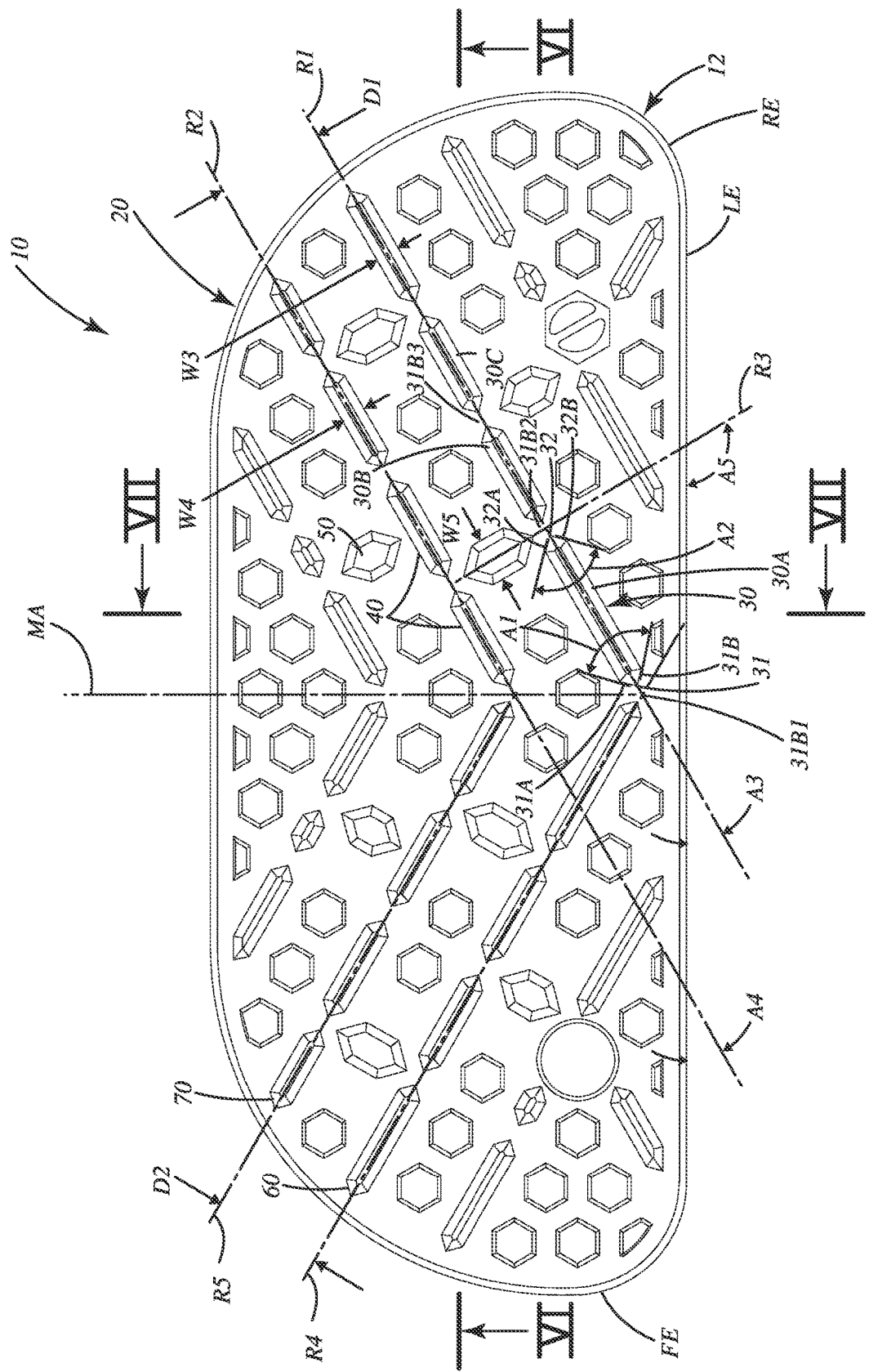
FIG. 4 is a lower view of the hoof block.
Figure 5:
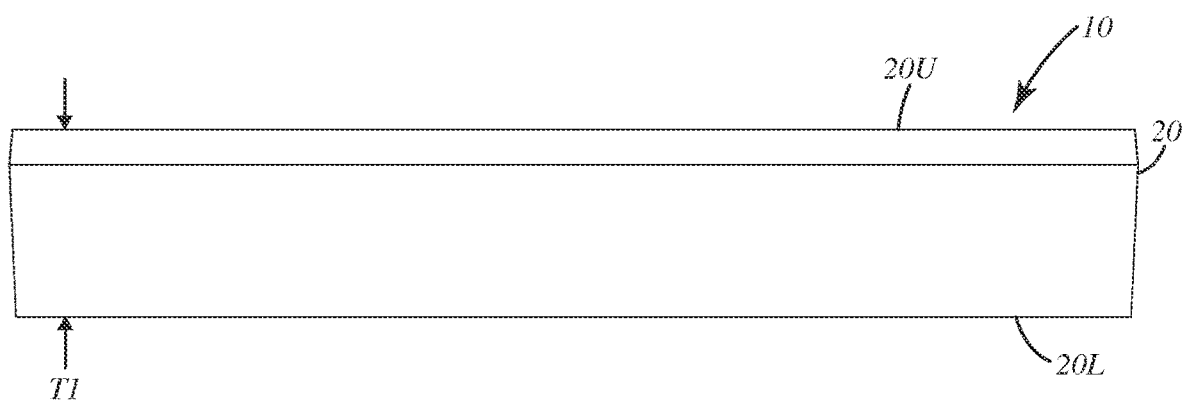
FIG. 5 is a side view of the hoof block.
Figure 6:
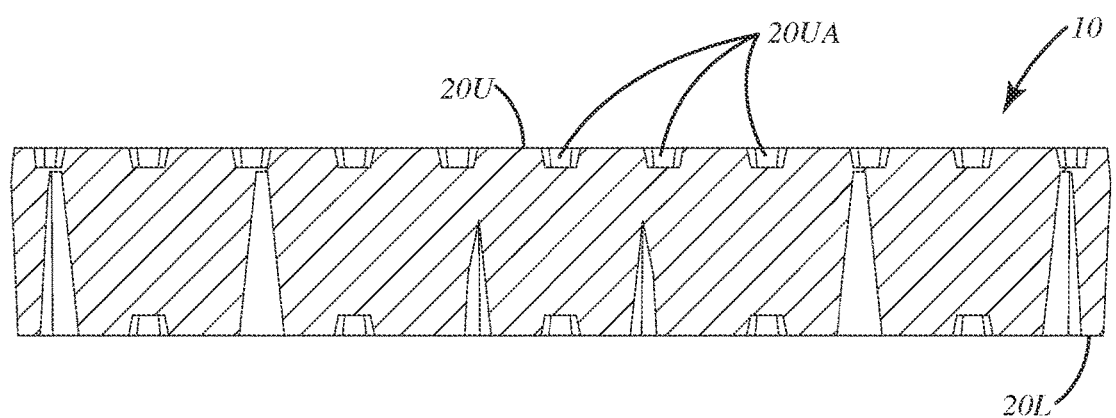
FIG. 6 is a section view of the hoof block taken along line VI-VI in FIG. 4.

The shearing apertures can include a first plurality of shearing apertures 30 extending upward from the lower surface 20L as shown in FIGS. 3, 4 and 6. Each of these first shearing apertures are shown as being polygonal in shape, but of course can take on other shapes or sizes to promote efficient breaking, ripping, tearing, deforming and/or shearing (all referred to collectively as shearing herein) of the body, bridges or other parts of the block 10. Each of the first shearing apertures 30 can include a first end 31 and a second end 32. Each of these first ends and second ends 31 and 32 can be pointed, and can terminate at a corner, small-radiused end and/or terminal wall. For example, the first end 31 can be formed by the intersection of a first wall 31A and a second wall 31B at a first angle A1. This first angle A1 can be optionally between 60 degrees and 120 degrees, inclusive, between 75 degrees and 100 degrees, inclusive, between 80 and 100 degrees, inclusive, or about 90 degrees or a right angle. Surprisingly and unexpectedly, these angles have been found to promote shearing of the adjacent bridges adjacent the ends of the shearing apertures, for example bridge 31B1 adjacent the first pointed end 31, yet still large enough so that the body, bridges, and other parts of the hoof block will not shear under standing compressive loads exerted by the cow on the block in excess of optionally at least 200 pounds, at least 300 pounds, at least 375 pounds, or at least 400 pounds, nor under walking or running loads of optionally at least 500 pounds, at least 750 pounds, at least 1000 pounds or at least 1250 pounds.

Optionally, the second ends 32 of the first shearing apertures 30 can be symmetric to the first ends 31. For example, the second end can be formed by the intersection of a third wall 32A and a fourth wall 32B at a second angle A2. The second angle A2 can be can be optionally between 60 degrees and 120 degrees, inclusive, between 75 degrees and 100 degrees, inclusive, between 80 and 100 degrees, inclusive, or about 90 degrees or a right angle. Further optionally, the shearing apertures can be of a hexagonal, heptagonal, octagonal or other shape, having a corresponding number of sides when viewed from a bottom view, for example as shown in FIG. 4.

With reference to FIGS. 3-4, the first shearing apertures 30 can lay along a first reference line R1 that is at a third angle A3, optionally between 30 degrees and 60 degrees inclusive, between 30 and 45 degrees, inclusive, or about 30 degrees relative to the linear interior edge LE. Each of the first shearing apertures also can be bounded at the ends by bridges, which are interposed between the apertures. For example, aperture 30A can be separated from aperture 30B at their respective pointed ends by a bridge 31B2. Likewise, aperture 30B can be separated from the aperture 30C by bridge 31B3. All of the apertures and bridges in the first set of shearing apertures can also lay along the common reference line R1, and can be parallel to one another along it. Generally, the first shearing apertures can be joined by the bridges adjacent at least one of the first pointed end and the second pointed end, and as mentioned above, the bridges can be configured to shear through the body when the hoof block encounters a pump impeller, and so that the hoof block breaks into a plurality of pieces that do not substantially impair continued operation of the pump impeller.

Figure 7:
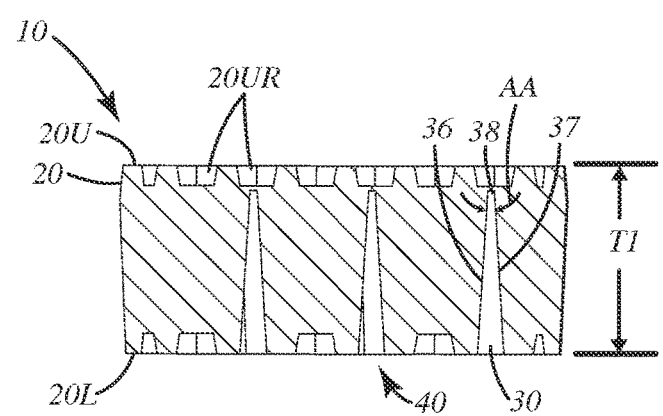
FIG. 7 is a section view of the hoof block taken along line VII-VII in FIG. 4.

As shown in FIG. 7, the shearing apertures can extend upward from the lower surface 20L toward the upper surface 20U of the body, through a portion or all of the thickness T1 of the body. The exemplary shearing aperture 30 can include and terminate at a first upper apex bounded by a first sidewall 36 and a second sidewall 37 disposed at an apex angle AA. This apex angle AA can be an acute angle, such that the sidewalls are optionally between 2 degrees and 20 degrees, inclusive, between 2 degrees and 10 degrees inclusive, between 5 degrees and 10 degrees, inclusive, about 2 degrees, about 3 degrees or about 4 degrees. With these angles, the material of the block 10 can be molded easily, with the parts of the mold pulled out of the apertures after forming. Further optionally, with the apex angle being an acute angle, the first sidewall 36 and second sidewall 37 can move away from one another when the hoof block encounters an impeller pump, and so that the hoof block material above the apex angle AA, also referred to as an apex bridge 38 shears so that the first and second sidewalls can separate from one another to propagate break-up, tearing and/or deformation of the hoof block. The other shearing apertures described herein can include such sidewall, apex angle and apex bridge above the respective shearing apertures, sometimes located in the upper half or upper third of the thickness T1 of the body.

As shown in FIGS. 3-4, the hoof block 10 can define a second set of shearing apertures 40 extending through the body 20. Each of the second shearing apertures 40 can lay along a second reference line R2 that is at a fourth angle A4 which can be optionally between 30 degrees and 60 degrees inclusive, between 30 and 45 degrees, inclusive, or about 30 degrees relative to the linear interior edge LE. Further optionally, these shearing apertures can be of a hexagonal, heptagonal, octagonal or other shape, having a corresponding number of sides when viewed from a bottom view, for example as shown in FIG. 4. The second shearing apertures 40 can be of the same or different lengths as the first shearing apertures 30 described above. The second shearing apertures 40 also can include the pointed ends and respective bridges between adjacent apertures as the first apertures.

To promote shearing along multiple lines and propagation planes, the second reference line R2 with its second shearing apertures 40, and the first reference line R1 with its first shearing apertures 30 can lay offset and distal relative from one another. For example, as shown in FIG. 4, the first reference line R1 can be offset a distance D1 from the second reference line R2. This distance can be less than the width W1, less than the length L1 and less than the thickness T1 of the body. The first reference line and the second reference line optionally can be parallel to one another, which can include orientations where the lines are less than 5 degrees misaligned from one another.

As shown in FIGS. 3-4, the hoof block 10 can define a third set of shearing apertures 50 extending through the body 20. Each of the third shearing apertures 50 can lay along a third reference line R3 that is at a fifth angle A5 relative to the interior edge LE of the hoof block. This fifth angle A5 can be different from the third A3 and fourth A4 angles. This fifth angle A5 can be optionally between 60 degrees and 150 degrees, inclusive, between 75 degrees and 120 degrees, inclusive, between 100 and 120 degrees, inclusive, or about 120 degrees. Further optionally, these shearing apertures can be of a hexagonal, heptagonal, octagonal or other shape, having a corresponding number of sides when viewed from a bottom view, for example as shown in FIG. 4. The third shearing apertures 50 can be of the same shapes, but optionally of different lengths and widths than the first and second shearing apertures 30 and 40 as described above. For example, the third shearing apertures can be wider and shorter than most of the first and second shearing apertures 30 and 40. The third shearing apertures 50 further can include the pointed ends and respective bridges between adjacent apertures as the first and second apertures.

To increase further shearing along multiple lines and propagation planes, the third reference line R3 can be transverse to the first reference line R1 and the second reference line R2. Optionally, the third reference line R3 can be at least 50 degrees, at least 60 degrees, at least 70 degrees, at least 80 degrees, at least 90 degrees, or about 90 degrees offset relative to the reference lines R1 and R2.

Further optionally, the first 30, second 40 and third 50 shearing apertures can include different widths to promote manufacturing as well as shearing propagation across and through the body when the hoof block 10 encounters a pump or impeller. For example, the first plurality of shearing apertures 30 each have a first width W3 perpendicular to the first reference line R1. The second plurality of shearing apertures 40 each have a second width W4 perpendicular to the second reference line R2. The third plurality of shearing polygonal apertures 50 each have a third width W5 perpendicular to the third reference line R3. The third width W5 can be greater than the first width W3 and the second width W4.

In some applications, the first and second shearing apertures can be duplicated and mirrored across an axis MA that is about midway between the front FE and rear RE of the hoof block 10. For example, there can be a fourth set of shearing apertures 60 and fifth set of shearing apertures 70 extending through the body 20 opposite the first 30 and second 40 apertures on the opposite sides of the axis MA. The fourth shearing aperture 60 can lay along a fourth reference line R4 that is transverse to the first reference line R1 and the second reference line R2. The fifth shearing aperture 70 can lay along a fifth reference line R5 that is transverse to the first reference line R1 and the second reference line R2. The fourth and fifth reference lines can be parallel to one another as illustrated, and both offset at angles relative to the first and second reference lines. Optionally, the fourth and fifth reference lines intersect the first reference line and the second reference line at, along or near the axis MA. The fourth and fifth shearing apertures further can include the pointed ends and respective bridges between adjacent apertures as the first and second apertures, and can be shaped, sized and dimensioned similar to the first and second shearing apertures. With the additional shearing apertures, the hoof block can be shearable into the multiple pieces additionally across the fourth and fifth shearing apertures and bridges along the fourth and fifth reference lines.

The fourth R4 and fifth R5 reference lines with their shearing apertures 60 and 70 can lay offset and distal relative from one another. For example, as shown in FIG. 4, the reference line R4 can be offset a distance D2 from the reference line R5. This distance can be less than the width W1, less than the length L1 and less than the thickness T1 of the body. The fourth reference line and the fifth reference line optionally can be parallel to one another, which can include orientations where the lines are less than 5 degrees misaligned from one another.

As mentioned above, the hoof block can include the various first, second, third, fourth and other shearing apertures that are joined by corresponding bridges. The bridges form and extend through a portion of the body. The shearing apertures also can include apex bridges 38 between the sidewalls of the apertures and the upper surface of the body 20. The bridges between the shearing apertures can be configured to shear through the thickness thereof and/or of the body when the hoof block encounters a pump impeller. In these cases, the pointed ends with respective angles at those ends propagate, enhance or increase shearing of those bridges so that they rapidly and quickly break apart. As a result, the hoof block breaks into multiple pieces that do not substantially impair continued operation of the pump impeller.

Figure 8:
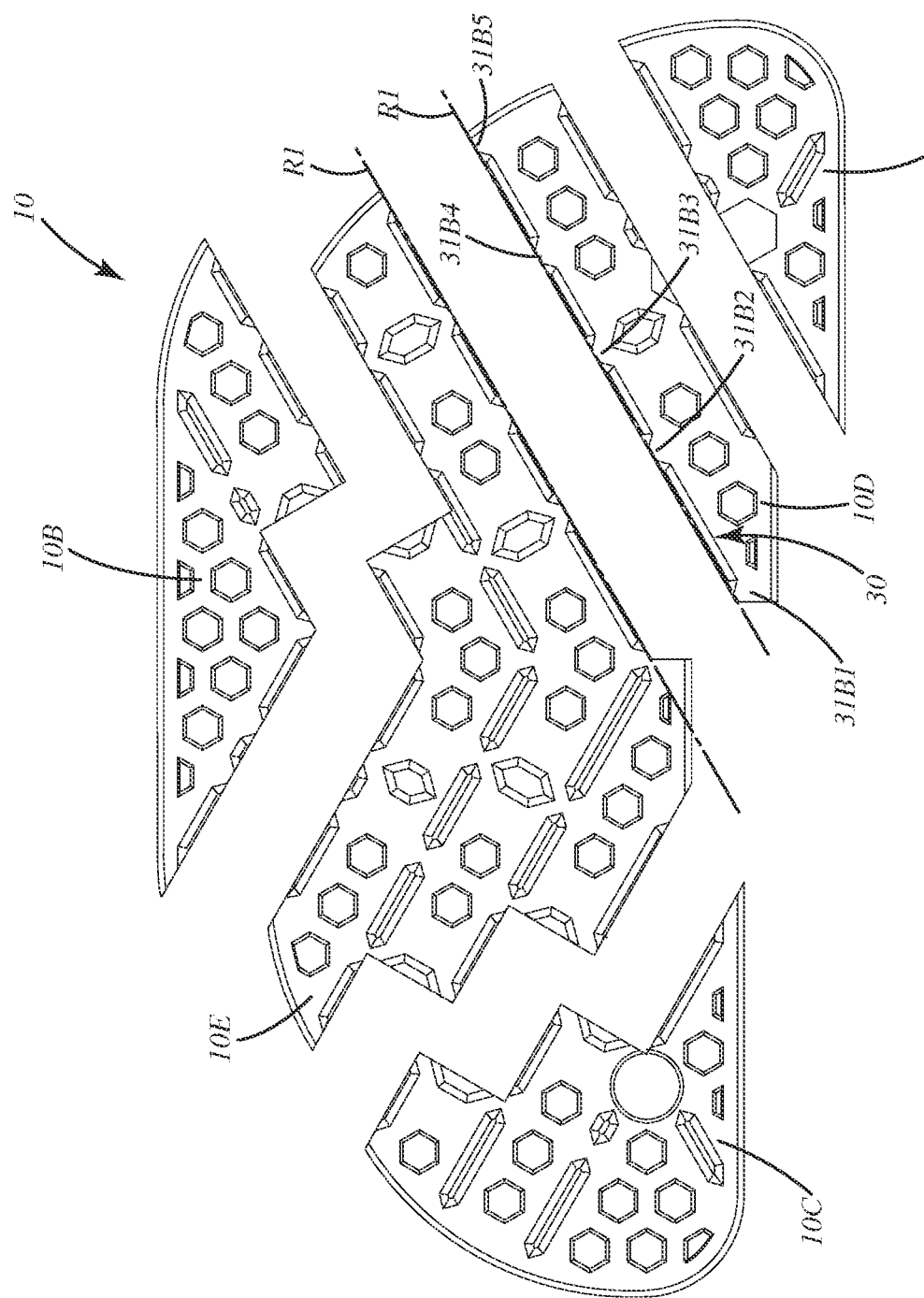
FIG. 8 is a perspective view of the hoof block after encountering a pump in a livestock facility and being separated into various pieces.

An example of a hoof block 10 after having departed from a cow hoof and entered a pump and/or encountered an impeller is shown in FIG. 8. There, the hoof block 10 has been fractured and sheared into multiple pieces 10A, 10B, 10C, 10D and 10E. Each of these pieces has a smaller volume and surface area than the hoof block 10 from which it was produced. More or fewer pieces can be created depending on the impeller speed and the impact of the hoof block with the impeller. As shown, the first shearing apertures 30 can be used to propagate shearing through the body and in particular the bridges 31B1, 31B2, 31B3, 31B4, and 31B5. With this shearing, the piece 10D can split or separate from the piece 10E, optionally along the reference line R1. Of course, due to the other shearing apertures and the exact forces exerted by the pump or impeller on the hoof block, the block can shear along other lines, across other bridges and through other shearing apertures.

The hoof block of the current embodiments can be constructed from a variety of materials, such as polyurethanes, polymers, thermoplastic polyurethanes, polyethylene, biodegradable polymers and/or natural or synthetic substances. The hoof block also can be sized, shaped and contoured in a variety of aesthetic shapes, which may or may not contribute to a particular function or operation of the hoof block.

The current embodiments of the hoof block 10 can be made using a variety of techniques. For example, the block 10 can be made by forming a body 20 bounded by a perimeter P. The perimeter can include an interior edge LE that transitions to at least one exterior edge FE, RE and/or EE that approximates an outer hoof edge of a livestock hoof. The method can include defining shearing apertures 30, 40, and/or 50 in the body, with each of the shearing apertures having one or more pointed ends as described above. The apertures can be defined via parts of the mold that project into a cavity that forms the block. In some cases, as described above, the shearing apertures can lay along reference lines as described above that are parallel and/or transverse to one another. In the mold, multiple bridges as described herein can be produced adjacent the ends of the shearing apertures. These bridges can be configured to be sheared through and fail when the hoof block encounters a pump impeller, and so that the hoof block breaks into a plurality of pieces that do not substantially impair continued operation of the pump impeller as described above.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A hoof block configured to join with a livestock hoof via an adhesive, the hoof block comprising:
   a body having a thickness extending between an upper surface and a lower surface, the thickness being at least ½ inch, the body bounded by a perimeter having a linear interior edge that transitions to at least one curvilinear exterior edge that approximates an outer hoof edge of the livestock hoof;
   a first plurality of shearing polygonal apertures extending upward from the lower surface, each of the first shearing polygonal apertures having a first end and a second end, the first end formed by an intersection of a first wall and a second wall at a first angle between 60 degrees and 120 degrees, inclusive, the second end formed by an intersection of a third wall and a fourth wall at a second angle between 60 degrees and 120 degrees, inclusive, the first plurality of shearing polygonal apertures laying along a first reference line that is at a third angle between 30 degrees and 60 degrees inclusive relative to the linear interior edge; and
   a second plurality of shearing polygonal apertures extending upward from the lower surface, each of the second shearing polygonal apertures laying along a second reference line that is at a fourth angle between 30 degrees and 60 degrees inclusive relative to the linear interior edge, but that is offset and distal relative to the first reference line,
   wherein the first plurality of shearing polygonal apertures and the second plurality of shearing polygonal apertures are joined by a plurality of bridges that are configured to shear through the thickness of the body when the hoof block encounters a pump impeller, and so that the hoof block breaks into a plurality of pieces that do not substantially impair continued operation of the pump impeller, and
   wherein each of the plurality of bridges are between respective ones of the first plurality of shearing polygonal apertures and each of the plurality of bridges are configured to shear through at least one of a thickness thereof and a thickness of the body when the hoof block encounters the pump impeller, such that the first and second ends joined at respective angles at those ends at least one of propagate, enhance, or increase shearing of the plurality of bridges so that the body breaks apart.

2. The hoof block of claim 1,
wherein the first reference line and the second reference line are parallel to one another.

3. The hoof block of claim 2,
wherein the third angle and the fourth angle are between 30 degrees and 45 degrees inclusive relative to the linear interior edge.

4. The hoof block of claim 1, comprising:
a third plurality of shearing polygonal apertures extending upward from the lower surface, each of the third shearing polygonal apertures laying along a third reference line that is transverse to the first and second reference lines,
whereby the hoof block is shearable into the plurality of pieces across the third plurality of shearing polygonal apertures along the third reference line.

5. The hoof block of claim 4,
wherein the first plurality of shearing polygonal apertures each have a first width perpendicular to the first reference line,
wherein the second plurality of shearing polygonal apertures each have a second width perpendicular to the second reference line,
wherein the third plurality of shearing polygonal apertures each have a third width perpendicular to the third reference line,
wherein the third width is greater than the first width and the second width.

6. The hoof block of claim 1,
wherein each of the first plurality of shearing polygonal apertures extends upward from the lower surface and terminates at a first upper apex bounded by a first sidewall and a second sidewall disposed at an apex angle between 2 degrees and 20 degrees, inclusive.

7. The hoof block of claim 1,
wherein the first end formed by the intersection of the first wall and the second wall includes the first angle that is about 90 degrees,
wherein the first wall transitions to a first sidewall that extends toward the second end,
wherein the second wall transitions to a second sidewall that extends toward the second end parallel to the first sidewall,
wherein the second end formed by the intersection of the third wall and the fourth wall includes the second angle that is about 90 degrees.

8. The hoof block of claim 7,
wherein the first sidewall is joined with the third wall, at the second end,
wherein the second sidewall is joined with the fourth wall at the second end.

9. The hoof block of claim 8,
wherein the upper surface includes a plurality of adhesive apertures that are not contiguous with any of the first plurality of shearing polygonal apertures and the second plurality of shearing polygonal apertures,
wherein the plurality of adhesive apertures does not extend to the lower surface,
whereby adhesive in the plurality of adhesive apertures does not leak from the hoof block via the first and second plurality of shearing polygonal apertures.

10. A hoof block configured to join with a livestock hoof via an adhesive, the hoof block comprising:
a body having an upper surface and a lower surface, the body bounded by a perimeter having an interior edge that transitions to an exterior edge that approximates an outer hoof edge of the livestock hoof; and
a first plurality of shearing apertures extending through the body, each of the first shearing apertures having a first pointed end and an opposing second pointed end, the first plurality of shearing apertures laying along a first reference line that is at a third angle between 30 degrees and 60 degrees inclusive relative to the interior edge,
wherein the first plurality of shearing apertures are joined by a plurality of bridges adjacent at least one of the first pointed end and the second pointed end, the plurality of bridges configured to shear through the body when the hoof block encounters a pump impeller, and so that the hoof block breaks into a plurality of pieces that do not substantially impair continued operation of the pump impeller, and
wherein each of the plurality of bridges are configured to shear through at least one of a thickness thereof and a thickness of the body when the hoof block encounters the pump impeller, such that the first and second pointed ends joined at respective angles at those ends at least one of propagate, enhance, or increase shearing of the plurality of bridges so that the body breaks apart.

11. The hoof block of claim 10,
wherein the first pointed end is formed by an intersection of a first wall and a second wall at a first angle between 60 degrees and 120 degrees, inclusive,
wherein the second pointed end is formed by an intersection of a third wall and a fourth wall at a second angle between 60 degrees and 120 degrees, inclusive.

12. The hoof block of claim 11, comprising:
a second plurality of shearing apertures extending through the body, each of the second shearing apertures laying along a second reference line that is at a fourth angle between 30 degrees and 60 degrees inclusive relative to the interior edge, but that is offset and distal relative to the first reference line.

13. The hoof block of claim 12,
wherein the first reference line and the second reference line are parallel to one another.

14. The hoof block of claim 10,
wherein each of the first plurality of shearing apertures extends upward from the lower surface and terminates at a first upper apex bounded by a first sidewall and a second sidewall disposed at an apex angle between 2 degrees and 20 degrees, inclusive.

15. The hoof block of claim 12 comprising:
a third plurality of shearing apertures extending through the body, each of the third shearing apertures laying along a third reference line that is transverse to the first reference line and the second reference line,
whereby the hoof block is shearable into the plurality of pieces across the third plurality of shearing apertures along the third reference line.

16. The hoof block of claim 12, wherein each of the plurality of bridges are between respective ones of the first plurality of shearing apertures and the second plurality of shearing apertures.

17. A method of making a hoof block, the method comprising:
- forming a body bounded by a perimeter having an interior edge that transitions to at least one exterior edge that approximates an outer hoof edge of a livestock hoof;
- defining a first plurality of shearing apertures in the body, each of the first shearing apertures having a first pointed end and an opposing second pointed end, the first plurality of shearing apertures laying along a first reference line that is at a third angle between 30 degrees and 60 degrees inclusive relative to the interior edge;
- producing a plurality of bridges adjacent at least one of the first pointed end and the second pointed end,
- wherein the plurality of bridges are configured to be sheared through and fail when the hoof block encounters a pump impeller, and so that the hoof block breaks into a plurality of pieces that do not substantially impair continued operation of the pump impeller; and
- disposing each of the plurality of bridges between respective ones of the first plurality of shearing apertures, with each of the plurality of bridges configured to shear through a thickness thereof and a thickness of the body when the hoof block encounters the pump impeller, such that the first and second pointed ends joined at respective angles at those ends at least one of propagate, enhance, or increase shearing of the plurality of bridges so that the body breaks apart.

18. The method of claim 17 comprising:
- defining a second plurality of shearing apertures in the body, each of the second shearing apertures laying along a second reference line that is parallel to the first reference line,
- whereby the hoof block is shearable into the plurality of pieces across the second plurality of shearing apertures along the second reference line.

* * * * *